United States Patent Office 3,230,799
Patented Jan. 25, 1966

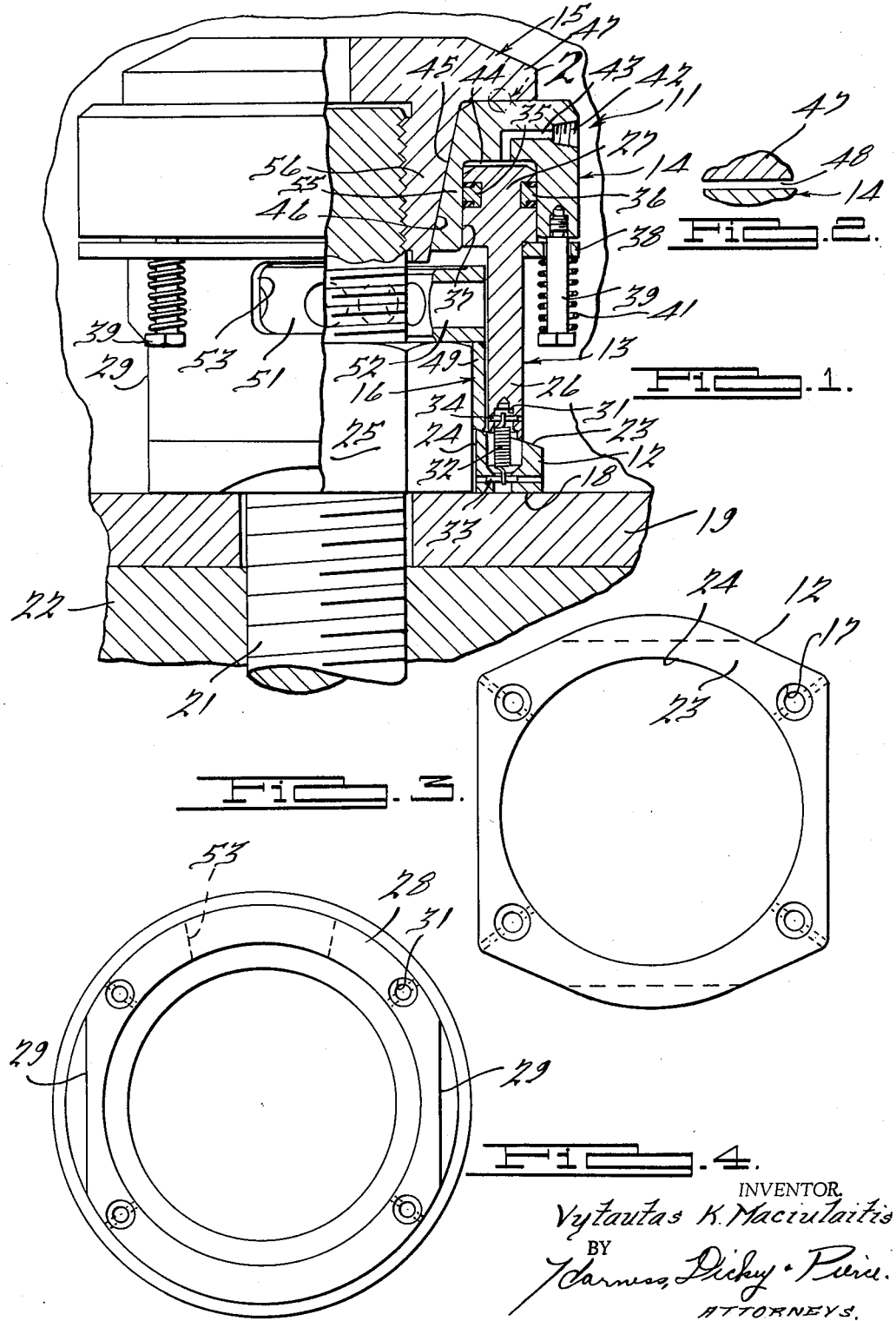

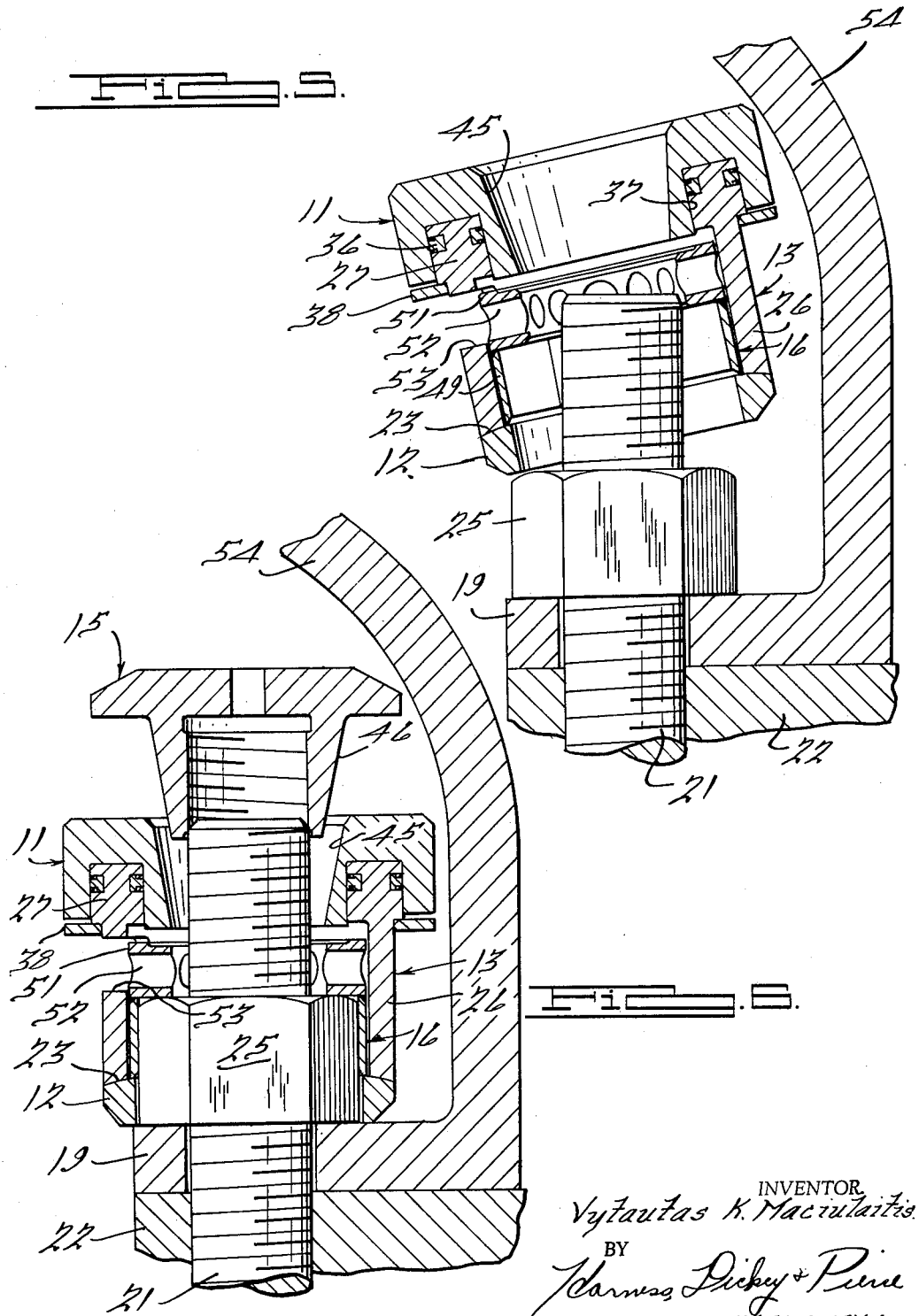

3,230,799
STUD TENSIONER
Vytautas K. Maciulaitis, Chicago, Ill., assignor to Diamond Power Specialty Corporation, Lancaster, Ohio, a corporation of Ohio
Filed Oct. 23, 1963, Ser. No. 318,241
6 Claims. (Cl. 81—54)

This invention relates to stud tensioners, and particularly to portable devices for tensioning studs a predetermined amount in order to achieve a desired holding force when the nut is tightened.

It is an object of the present invention to provide a novel and improved stud tensioner of relatively small overall dimensions and of very light weight, which will be capable of use on studs in confined spaces, such as those on the flanges of certain types of heat exchangers.

It is a further object to provide an improved stud tensioner of this character which is of simple and reliable construction, is efficient in use, and is adapted to adjust itself to flange surface irregularities.

Other objects, features, and advantages of the present invention will become apparent from the subsequent description, taken in conjunction with the accompanying drawings.

In the drawings:

FIGURE 1 is a partially sectional side elevational view of a suitable form of the stud tensioner of this invention, shown as applied to a stud;

FIGURE 2 is an enlarged fragmentary view taken in the area marked 2 of FIGURE 1 and showing the spacing between the nut and cylinder;

FIGURE 3 is a top plan view of the base;

FIGURE 4 is a bottom plan view of the piston;

FIGURE 5 is a sectioned side elevational view showing the manner in which the tensioner may be applied to a stud in a confined space, the tensioner being partially slipped over the stud; and FIGURE 6 is a view similar to FIGURE 5 but with the tensioner resting on the flange and the nut about to be threaded onto the stud.

Briefly, the illustrated embodiment of the invention comprises a base having a partially spherical upper surface and supporting a piston in the form of a cylindrical member with a lower partially spherical surface and an upper piston head. The piston fits in a cylinder which also comprises an annular member having a downwardly facing annular cylinder chamber within which the piston slides. The inner surface of the inner cylinder wall is flared upwardly and outwardly, and a nut is threadable on the study and has a downwardly tapered outer surface complementary to the flared cylinder surface.

A pressure fluid connection is provided for the chamber formed by the piston and cylinder, application of fluid pressure causing the cylinder to rise. This will cause the nut to be lifted due to the upward component of force acting on the tapered nut surface, and the stud will thus be tensioned so that the stud nut may be tightened.

The radially outward force on the nut created by the stud thread surfaces will be counteracted by the inner cylinder wall and the cylinder fluid pressure, and the radially inward force of the fluid pressure on the inner cylinder wall will be likewise counteracted by the nut. The tapered interfitting surfaces of the nut and cylinder will thus not only enable a decrease in total overall height in the unit by acting as vertical force-transmitting surfaces, but will enable a decrease in radial dimensions as well, since the wall thickness requirements of the nut and of the cylinder will be reduced.

Referring more particularly to the drawings, the stud tensioner is generally indicated at 11 and comprises a base 12, a piston generally indicated at 13, a cylinder generally indicated at 14, a nut generally indicated at 15, and a stud nut engaging socket generally indicated at 16.

Base 12 comprises a member having the outlines seen in FIGURE 2; that is, it is annular in shape but with four circumferentially spaced enlarged portions which are provided with clearance apertures 17. The lower surface 18 of base 12 is flat so that it may engage a flange 19 through which a stud 21 extends, the stud being threaded into a flange 22, as seen in FIGURE 1.

The upper surface 23 of base 12 is of partially spherical shape, that is, it is included in an imaginary spherical surface the center of which is some distance below the lower surface 18 of base 12, as seen in FIGURE 1. The cylindrical inner surface 24 of base 12 is of sufficient diameter to accommodate the nut 25 which is threaded onto stud 21.

Piston 13 is likewise of annular shape, having an upright portion 26 and a piston portion 27 at the upper end of portion 26. The lower end of upright portion 26 has surface 28 with a configuration complementary to that of surface 23, so that these surfaces may slide upon each other. The wall thickness of upright portion 26 is approximately the same as the thickness of base 12, except for the fact that upright portion 26 does not have widened portions corresponding to those which have apertures 17. Upright portion 26 does have oppositely disposed relieved areas 29, as seen in FIGURES 1 and 3.

Upwardly extending apertured portions 31 are provided in the underside of upright portion 26, and helical coil tension springs 32 are disposed within these apertures, which correspond in location to apertures 17 of base 12. The four apertures 17 and four apertures 31 being shown in the illustrated embodiment. There are four springs 32, and the ends of these springs are secured to the base and piston by cross pins 33 and 34 respectively, as seen in FIGURE 1.

Piston portion 27 of piston 13 is radially thicker than upright portion 26, having vertically cylindrical inner and outer surfaces with grooves within which are disposed fluid seals 35 and 36 respectively. Cylinder 14 is of annular shape and has an upwardly extending annular recess 37 within which piston portion 27 is slidably disposed. A retaining ring 38 is secured to the underside of cylinder member 14 by means of headed posts 39 threaded into the cylinder underside and carrying helical coil compression springs 41, which urge retaining ring 38 upwardly. The retaining ring surrounds the piston portion 27 of piston 13, the latter overlapping the retaining ring whereby upward movement of cylinder 14 with respect to piston 13 will result in downward movement of ring 38 and compression of springs 41.

A pressure fluid port 42 is provided in the outer surface of cylinder 14, and a conduit 43 connects this port with the chamber 44 formed by the piston and cylinder.

The inner surface of 45 of the inner wall of cylinder 14 is upwardly and outwardly flared, and is adapted to coact with a tapered surface 46 of complementary shape which is formed on nut 15. The nut has an internal thread corresponding to that of stud 21, and an upper flange portion 47 which overlaps the upper horizontal surface of cylinder 14.

As seen in FIGURE 2, a space 48 exists between flange portion 47 of nut 15 and the upper surface of cylinder 14 when surfaces 45 and 46 are engaged. This spacing is slight, but is provided in order to insure proper engagement of surfaces 45 and 46. The angle of taper of these surfaces is preferably sufficient to avoid self-locking of the nut and cylinder during operation of the stud tensioner; an angle of 20° from the vertical has been found suitable for this purpose. In this case, a clearance 48 of about 0.002 inch was found sufficient to insure intimate contact between surfaces 45 and 46.

Socket 16 is rotatably disposed within upright portion 26 of piston 13 and comprises a socket portion 49 adapted to fit over nut 25, and a handle-receiving portion 51 secured to the upper end of portion 49 and adapted to rest on nut 25 and receive a handle bar (not shown) for rotating the socket. More particularly, a plurality of circumferentially spaced apertures 52 are provided in portion 51, and a clearance aperture 53 is provided in piston portion 26 through which the bar may be inserted into any particular aperture in order to rotate socket 16 and nut 25. The height of socket 16 is somewhat less than the distance between base 12 and the piston portion 27 of piston 13, so that some play will be permitted the socket in a vertical direction, thus facilitating its engagement with nut 25.

The operation of stud tensioner 11 may be described with respect to FIGURES 5 and 6. With nut 15 removed, the remainder of the stud tensioner will be slipped over stud 21 and nut 25, as seen in FIGURE 5. This figure also shows a wall 54 extending upwardly from flange 19 which may form part of a heat exchanger or other structure, but which severely limits the space available to mount the stud tensioner in position. The wall is illustrated in order to emphasize the advantage of the present invention when used in confined areas.

The stud tensioner will be lowered until base 12 engages flange 19, with socket 16 slipped over nut 25, as seen in FIGURE 6. Any irregularities on flange 19 will be compensated for by sliding movement of piston 13 on surface 23 of base 12. Nut 15 will then be threaded onto stud 21 until surface 46 thereof engages surface 45 of cylinder 14, at which point there will be a slight space 48 existing between the upper portion of the nut and the upper cylinder surface.

Fluid pressure will then be applied to port 42, and the pressure created in chamber 44 will cause cylinder 14 to rise with respect to piston 13, pins 39 sliding upwardly through retaining ring 38 and compressing springs 41. The downward pressure on piston 13 will be transmitted through base 12 to flange 19, and the upward force on cylinder 14 will be transmitted through surface 46 of nut 15 to the nut itself, and thus to stud 21, which will be tensioned and elongated.

This elongation will continue to the desired extent, after which the fluid pressure will be held in chamber 44 while socket 16 is rotated by a bar (not shown) inserted in successive apertures 52. When nut 25 is sufficiently tightened, pressure will be released from chamber 44 through port 42 and springs 41 will draw cylinder 14 downwardly with respect to piston 13, relieving the pressure on nut 15. As stud 21 contracts, nut 25 will be drawn tightly against flange 19, thus forcing the latter against flange 22 with the desired amount of force. Nut 15 may then be unthreaded from stud 21, it being recalled that the angle of taper of surfaces 45 and 46 is greater than that which would cause self-locking between the nut and cylinder.

In order to remove a nut 25 from stud 21, the operation will be the same except that nut 25 will be rotated in the opposite direction while fluid pressure is applied to chamber 44.

It will be observed that the radially outward camming force of the stud threads on nut 15 while the stud is being tensioned will be counteracted by the engagement of inner cylinder wall 55 with the thread-bearing wall 56 of nut 15, and also by the fluid pressure within chamber 44. Furthermore, the radially inward pressure of fluid within chamber 44 on cylinder wall 55 will be counteracted by the presence of nut wall 56 and the radially outward camming forces exerted by the threads of stud 21. These combined actions result in the ability to achieve a relatively high degree of tensioning force with much smaller wall thicknesses of both the cylinder and nut than would otherwise be possible. In fact, it can be stated that the combined radial thickness of portion 55 of cylinder 14 and portion 56 of nut 15 will approximately equal the wall thickness of the nut alone which would be required with conventional stud tensioner constructions. The overall radial size of the unit may thus be materially decreased as compared with previous constructions, permitting the tensioner to be used in confined spaces. The total height of the unit may also be considerably smaller than previous constructions because of the novel configuration of the parts, and especially the use of the wall portion of the nut both to threadably engage the stud and to receive the vertical lifting forces from the cylinder.

While it will be apparent that the preferred embodiment of the invention is well calculated to fulfill the objects above stated, it will be appreciated that the invention is susceptible to modification, variation and change without departing from the proper scope or fair meaning of the subjoined claims.

What is claimed is:

1. In a stud tensioner for a stud having an exposed portion of predetermined length, an annular piston having an upright portion and a piston portion with a total height substantially less said predetermined length, means for mounting the lower end of said upright portion on the portion of a flange surrounding a stud to be tensioned, an annular cylinder surrounding the piston portion of said piston and having annular inner and outer walls within which the piston portion is disposed, the inwardly facing surface of said inner wall having an upward and outward flare, and a nut having a wall portion with a threaded inner surface engageable with said stud and a tapered outer surface complementary to said flared surface, said cylinder, piston portion of said piston and wall portion of said nut being substantially within parallel planes defining the limits of that portion of the stud thread engaged by said nut, fluid pressure means for moving said cylinder upwardly and causing said flared cylinder surface to exert radially inward and axially upward forces on said tapered nut surface.

2. The combination according to claim 1, further provided with a retaining ring surrounding said upright portion of said piston immediately below the piston portion thereof, a plurality of posts secured to the outer wall of said cylinder and extending through said retaining ring, and a plurality of springs on said posts engageable with the underside of said retaining ring.

3. The combination according to claim 1, further provided with a socket rotatably mounted within the upright portion of said piston and engageable with a nut threaded on said stud, and means for manually rotating said socket.

4. The combination according to claim 1, said means for permitting said upright piston portion to engage said flange portion comprising a base having a flat lower surface and a partially spherical upper surface, the underside of said upright piston portion having a partially spherical configuration complementary to the upper base surface, and resilient means connecting said base and upright piston portion.

5. The combination according to claim 4, said resilient means comprising a plurality of circumferentially spaced helical coil tension springs disposed within aligned apertured portions in said base and upright piston portion, and means securing the ends of said springs to said base and upright piston portion.

6. In a stud tensioner for a stud having an exposed portion of predetermined length, an annular base having a flat undersurface adapted to engage a flange portion surrounding a stud to be tensioned and a partially spherical upper surface, an annular piston having an upright portion with a partially spherical underside engageable with said base and an enlarged piston portion at the upper end of said upright portion, the total height of said piston being substantially less than said predetermined length, seals mounted in the inner and outer surfaces of said piston portion, an annular cylinder having a downwardly open annular chamber within which said piston portion is slidably disposed, and inner, outer and upper walls forming said chamber, a vertically yieldable retaining ring secured to the underside of said outer wall and engageable with the piston portion of said piston, a pressure fluid connection in said cylinder for said chamber, an upwardly and outwardly flared inwardly facing surface on said inner cylinder wall, a nut having a wall portion and an outwardly extending flange portion, the wall portion being disposable within the inner wall of said cylinder and the flange portion above the upper wall thereof, the wall portion having an internal thread cooperable with the stud thread, said cylinder, piston portion of said piston and wall portion of said nut being substantially within parallel planes defining the limits of that portion of the stud thread engaged by said nut, the outer surface of said nut wall portion having a downward and inward taper complementary to the flare of said inner cylinder wall surface, the dimensions of said flared and tapered surfaces being such that when in engagement the flange portion of said nut will be spaced above said upper cylinder wall, whereby an upward force on said cylinder will cause said flared cylinder surface to exert radially inward and axial upward forces on said tapered nut surface, the location of said chamber with respect to said cylinder and nut surfaces being such that fluid pressure within said chamber will also exert a radially inward force on said nut surface through said inner cylinder wall, a socket rotatably mounted within said upright piston portion, the lower end of said socket being engageable with said base, resilient means connecting said base and upright piston portion, a clearance aperture in said upright piston portion, and tool-receiving means on said socket accessible through said clearance aperture.

References Cited by the Examiner

UNITED STATES PATENTS

| | | | |
|---|---|---|---|
| 2,760,393 | 8/1958 | Stough | 81—55 X |
| 3,035,813 | 5/1962 | Horel et al. | |
| 3,077,335 | 2/1963 | Singleton. | |
| 3,099,434 | 7/1963 | De Mart. | |
| 3,128,990 | 4/1964 | Brooks et al. | 81—54 X |

WILLIAM FELDMAN, *Primary Examiner.*

MILTON S. MEHR, *Examiner.*